3,208,977
POLYVINYL ACETALS
Arnold Charles Schoenthaler, East Brunswick, and Peter Foster Warfield, Westfield, N.J., assignors to E. I. du Pont de Nemours and Company, Wilmington, Del., a corporation of Delaware
No Drawing. Filed Sept. 2, 1964, Ser. No. 394,040
3 Claims. (Cl. 260—73)

This application is a continuation-in-part of application Serial No. 58,636, filed September 27, 1960, abandoned.

This invention relates to dye intermediates for use in the field of color photography. More particularly, it relates to polymeric dye intermediates which are resistant to migration in water-permeable colloid layers of photographic elements, e.g., films and papers. Still more particularly, it relates to polymeric cyan dye intermediates or color formers.

The 1-hydroxy-2-naphthamido color formers are known in the art. In Patent 2,465,067, issued to Corner and Woodward, it is disclosed that polyvinylacetal cyan color formers derived from aryl amides of 1-hydroxy-2-naphthoic acid can be used in color photographic elements to produce very stable cyan images. The color formers described in this patent, however, give dyes with peak absorption at relatively long wavelengths and which appear slightly greenish in hue. Phenolic cyan color formers are known to give dye images having absorption peaks at shorter wavelengths, thereby giving images having a more blueish hue; but it is well recognized that these phenolic color formers do not form dyes in the color development process which exhibit the image stability of those formed from naphtholic color formers.

An object of this invention is to provide a new class of cyan color formers for use in color photographic elements. A more particular object is to provide cyan color formers having an optimum combination of spectral properties and stability. Still more particularly, it is an object to provide color formers which have a hue which is less greenish than previously known, stable cyan color formers. Another object is to provide polymeric color formers which are compatible with gelatin and are non-migratory. Still other objects will be apparent from the following detailed description of the invention.

The polymeric color formers of this invention are polyvinyl acetals of 1-hydroxy-2-naphthamidoalkylaldehyde that have intralinear $(-CH_2CHOH-)_x$ units present in an amount up to 90% of the $$-CH-CH_2-$$

units of the polymer chain and contain intralinear units of the formula

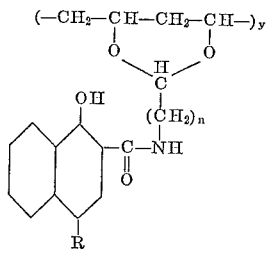

wherein R is a member selected from the group consisting of H, $SO_3H$ and Cl; $n$ is 1, 2, 3 or 4, and $x$ and $y$ represent the number of such units in the polymer. The free bonds of the units are linked in chain form, the para-position in the aromatic ring being unsubstituted or containing the $SO_3H$ or Cl groups which are replaceable in a dye-coupling reaction so that upon chromogenic development of a silver halide image with a primary aromatic amine color developing agent indoaniline dye images are formed with the above-described polyvinyl acetals. The remaining positions in the aromatic ring can be substituted with any of the conventional substituents used in naphtholic color formers which do not interfere with azo dye coupling or color coupling developing reactions. Suitable such substituents include alkyl, e.g., methyl and ethyl; aryl, e.g., phenyl and naphthyl; alkoxy, e.g., methoxy and ethoxy; aryloxy, e.g., phenoxy; Br, Cl, nitro, amino, acylamino, sulfonic, carboxylic, sulfonamide, trifluoromethyl or beta-hydroxyethyl groups or atoms. These acetals may contain, in addition to any intralinear $$-CH_2CHOH-$$

units, cyclic acetal linkages corresponding to those obtained by acetalization with an aldehyde containing a sulfonic acid, the said aldehyde being otherwise unsubstituted. In the resulting polyvinyl acetals, the sulfonic acid group may, if desired, be neutralized and in the form of alkali metal (Na or K) or ammonium salt groups. Suitable aldehydes for this purpose are described in Woodward U.S. Patent 2,462,151 and Jennings U.S. Patent 2,462,503. The acetals of this invention are essentially colorless and even when soluble in water, or water containing 20% by weight of ethanol, do not migrate in thin gelatin layers.

Practical new color formers of the invention are mixed acetals prepared by attaching to polyvinyl alcohol, via acetal linkages, both the above color former nucleus and an aldehyde nucleus containing a sulfonic acid group. In general, on the basis of the reactants used in the preparation of the polymeric color former, it is preferred that for each 100 grams of polyvinyl alcohol there be present in the reacting mixture from 0.1 to 0.3 mole of the color-forming intermediate and from 0.1 to 0.3 mole of the aldehyde nucleus containing a sulfonic acid group which would result in the presence of intralinear units of the formula

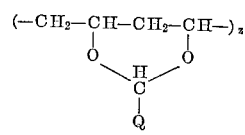

where $z$ is the number of units and Q is a member selected from the group consisting of sulfophenyl and its alkali metal and ammonium salts.

The amount of color forming 1-hydroxy-2-naphthamidoaldehyde acetal groups that are present in the polyvinyl acetals of this invention can be explained in mole percentages, as follows: The molecular weight of the vinyl alcohol unit being 44, for each 100 g. of polyvinyl alcohol there will be 2.27 moles of this unit. Each mole of color former intermediate and each mole of the aldehyde nucleus containing a sulfonic acid group reacts with 2 moles of the vinyl alcohol unit, so 0.1 to 0.3 mole of one of these reactants can combine with 0.2 to 0.6 mole of the vinyl alcohol unit. Considering both reactants, 0.4 to 1.2 moles of the vinyl alcohol unit will have reacted per each 100 g. of polyvinyl alcohol. By subtracting these amounts from 2.27 moles there will remain 1.87 to 1.07 moles. The remaining mole fraction (obtained by dividing the latter values of 2.27) will be 0.82 and 0.47 (or 82% to 47%). By subtraction and division by two, for the moles of the intermediate and aldehyde nucleus, in the case of the tricomponent polymer the mole ratios of the three components would then be 0.47 to 0.82; 0.265 to 0.09; 0.265 to 0.09. The mole percentages would be 47 to 82; 26.5 to 9; and 26.5 to 9.

In the polyvinyl acetal color formers, the equivalent weight of the polymeric color former is of considerably more significance than the ratio of reactants used in its preparation. For purposes of definition, the equivalent weight is the number of grams of dry color-forming polymer containing one gram molecular weight of the active color-forming ingredient. An analytical method has been established for determining this equivalent weight from the ultraviolet spectral analysis of solutions of the color former. It is preferred that the equivalent weight of the color-forming cyan polymers be from about 400 to about 2000 since low equivalent weight color formers are essential in the manufacture of multilayer photographic elements having the thin layers associated with high resolution and sharpness.

Water-soluble, macromolecular, neutralized acetals of vinyl alcohol polymers useful in accordance with this invention are prepared by acetalization from (1) polyvinyl alcohol of low molecular weight (viscosity of 4% aqueous solution at 20° C., 1.5 to 6.0 centipoises), (2) polyvinyl alcohol of medium molecular weight (viscosity of 4% aqueous solution at 20° C., 15 to 30 centipoises) which may be substituted with acetate, propionate, acetal, propional, and butyral groups, and (3) 75 to 100% hydrolyzed interpolymers of vinyl acetate with 0.05 to 0.5 mol equivalents of terminally unsaturated mono-olefins, e.g., ethylene, such as described in Roland United States Patent No. 2,386,347, and (4) completely hydrolyzed interpolymers of vinyl acetate with minor portion (less than 50%) of polymerizable vinyl or vinylidene compounds, for example, vinyl chloride, vinyl cyanide, alkyl methacrylates, e.g., methyl and ethyl methacrylate, etc., with an aldehyde containing a sulfonic acid group.

The water-soluble macromolecular acetals of this invention can be made by reaction of the 1-hydroxy-2-naphthoic acid amidoalkylaldehyde or an acetal thereof, and, if desired, the aldehyde containing the solubilizing or sulfonic acid group with the vinyl alcohol polymer under acetal-forming conditions. For example, the acetalization may be conveniently carried out in solution or suspension in water or an organic solvent or diluent using a catalyst such as phosphoric acid, sulfuric acid, hydrochloric acid, etc. Suitable procedures and aldehydes are described in United States Patent 2,310,943 and in German Patent 643,650. The free acid groups can be converted into salt groups by a simple neutralization as described above and in the United States patent.

The requisite color-forming intermediate can be prepared by condensing phenyl 1-hydroxy-2-naphthoate with aminoacetaldehyde diethylacetal:

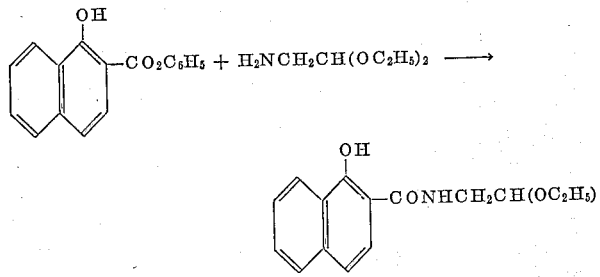

The polymeric color former is then prepared by acid catalyzed acetalization of polyvinyl alcohol with the above intermediate and o-formylbenzenesulfonic acid.

The polymers of the invention form cyan indoaniline dyes when latent silver halide images are developed in their presence in alkaline developers containing any primary aromatic amine color-developing agent described in U.S. Patent 2,481,476. The cyan dye images have excellent color, stability and definition. The polymers can be admixed with aqueous gelatin or other water-permeable organic colloids of high molecular weight having protective colloid properties, both of natural and synthetic type, which are binding agents for silver halide grains. They do not diffuse when multilayer films containing them are treated in aqueous developing, fixing, bleaching or washing baths. They are especially useful in gelatino-silver halide emulsion layers.

The invention will be further illustrated by, but is not limited to, the examples given below.

PROCEDURE A

*N-(β,β-diethoxyethyl)-1-hydroxy-2-naphthamide*

A solution of 300 g. (1.14 moles) of phenyl 1-hydroxy-2-naphthoate and 150 g. (1.13 moles) of aminoacetaldehyde diethyl acetal in 900 ml. of absolute alcohol was refluxed overnight. The resulting nearly black solution was cooled to 0° C. in an ice-salt bath and the crystals which separated were filtered. The product was purified by washing on the funnel with cold alcohol. After air drying, there was obtained 244 g. (71% of theoretical yield) of cream colored crystals, M.P. 97.0–98.0° C.

PROCEDURE B

*Sulfonation of N-(β,β-diethoxyethyl)-1-hydroxy-2-naphthamide*

Sixty grams (0.20 mole) of the color-forming intermediate prepared in Procedure A was added to 300 ml. of concentrated sulfuric acid over a ten minute period, the temperature rising to 40° C. The solution was stirred five minutes, then poured into a mixture of 400 ml. of saturated salt solution and 500 g. of ice with vigorous stirring. The resulting precipitate was filtered, washed with salt solution, then with water, and dried. The crude product was further purified by trituration in 500 ml. of boiling acetonitrile. There was thus obtained 52 g. (79% of theoretical yield) of an off-white powder, M.P. 245–250° C. dec. (gas). The powder, N-(β,β-diethoxyethyl)-1-hydroxy-2-naphthamide-4-sodium sulfonate is soluble in 5% Na$_2$CO$_3$ and gave a cyan dye with oxidized p-aminodiethylaniline hydrochloride.

EXAMPLE I

The following materials were charged to a 3 liter vessel equipped with a stirrer, thermometer, and condenser:

860 ml. 95% ethanol
250 ml. distilled water
50 g. anhydrous sodium o-formylbenzenesulfonate
125 g. polyvinyl alcohol (completely hydrolyzed polyvinylacetate, having a solution viscosity of 4–6 centipoises in 4% aqueous solution at 20° C.)
42 g. p-toluenesulfonic acid After holding this mixture for 1 hour between 70 and 75° C. there was added 100 g. of the cyan color-former intermediate prepared as described in Procedure A. The reaction mixture was held for another hour at 70 to 75° C. and then neutralized with 5% sodium hydroxide to a pH between 5.5 and 6.5. The hot solution was transferred to a 3-gallon can and the product polymer was coagulated by the slow addition of 5 liters of acetone. The coagulum was hardened by cooling to 0° C. After settling, the supernatant acetone was decanted and the solid washed with 4 liters of acetone, and finally with 4 liters of methanol. Excess methanol was removed by filtration and the methanol-wet coagulum was dissolved in hot water to give a clear solution of the polymeric cyan color-former which has a concentration of 7% on a weight basis. The equivalent weight of the color-former, the 1-hydroxy-2-naphthamidoethylaldehyde/sodium sulfophenyl mixed acetal of polyvinyl alcohol, was determined by means of ultraviolet spectral analysis to be 760.

EXAMPLE II

Example I was essentially repeated except that the reactants were scaled down in quantities to 40% of those used in Example I. As the cyan color-former intermediate there was added 43.5 g. of the sulfonated intermediate whose preparation was described in Procedure B. The product was a polymeric cyan color former with an equivalent weight of 818. The material dissolved in hot water to give a clear solution which had a concentration of 7% on a weight basis.

EXAMPLE III

Example I was essentially repeated except that the 125 g. of polyvinyl alcohol was 86–89% hydrolyzed from the original polyvinyl acetate and had a solution viscosity of 19–25 centipoises in 4% aqueous solution at 20° C. The resultant polymeric mixed acetal, cyan color former was dissolved in hot water, as in Example I, to give a 7% by weight solution. The equivalent weight of the polymer was 1310.

EXAMPLE IV

Example I was essentially repeated except that the 50 g. of anhydrous sodium o-formylbenzenesulfonate was omitted and the 125 g. of polyvinyl alcohol (completely hydrolyzed polyvinylacetate) had a solution viscosity of only 1.9 centipoises in 4% aqueous solution at 20° C. The resultant polymeric, cyan color former was dissolved in hot 50% alcohol-water (by volume) mixture to give a 4% by weight solution. The equivalent weight of the polymer was 1560.

Procedures have been shown for preparing color formers containing a naphthol nucleus which is unsubstituted in the position para to the hydroxyl group or in which this position is substituted with a sulfonic acid group. In addition, to the sulfonic acid group, this position para to the hydroxyl group may be substituted by other groups replaceable in dye coupling reactions such as a halogen atom. The remaining positions in the aromatic rings may be substituted with any substituents which do not interfere with azo dye coupling or color coupling development reactions contained in color formers.

EXAMPLE V

A gelatino-silver halide high speed cine negative emulsion containing 6.8 mole percent AgI and 93.2% AgBr was precipitated, ripened, washed, chemically sensitized with sulfur and gold, optically sensitized and digested (or second-ripened) in a conventional manner. Two portions, each containing 0.1 mole of silver halide, were taken from the emulsion. To the portion labeled A there was added 181 g. of the 7% (by weight) solution of the naphtholic cyan color former prepared in Example I. To the portion labeled B there was added 236 g. of an aqueous alcoholic solution containing 6% (by weight) of a phenolic cyan color former of equivalent weight 1130, this color former being a mixed acetal of polyvinyl alcohol, N-(m-formylphenyl)-6-methylsalicylamide and sodium o-formylbenzenesulfonate.

The usual coating adjuvants were added to the two emulsions and they were coated and dried in a conventional manner on cellulose triacetate photographic film base, giving silver halide coating weights of 40 and 30 mg./ square decimeter respectively for Film A (containing the naphtholic color-former) and Film B (containing the phenolic color-former).

Film strips of these two coatings were exposed to red light in a sensitometer equipped with a neutral density square-root-of-two step wedge and processed by reversal with all solutions at 75° F. First they were developed in a conventional black and white, p-methylaminophenol sulfate-hydroquinone developer, then treated with an acid shortstop bath, water washed, and re-exposed by flashing to white light. They were then color developed for 20 minutes in a solution of the following composition:

$Na_2SO_3$ (anhydrous) _____ g__ 2.0
4 - amino-N-ethyl-N-($\beta$-methanesulfonamidoethyl)-m-toluidine sesquisulfate monohydrate _____ g__ 10.0
KBr _____ g__ 2.0
$Na_2CO_3 \cdot H_2O$ _____ g__ 47.0
3 N NaOH _____ cc__ 35.0
$H_2O$ to make 1 liter.
pH=11.8±0.1.

Processing was continued with another acid shortstop treatment, washing with water, bleaching, washing, alkaline fixing, washing and drying.

Densities of the processed film were read at a wavelength of 644 millimicrons on a precision integrating-sphere densitometer (Frayne, J. G., with Crane, G. R., J. Soc. Motion Picture & Television Eng., volume 35, No. 2, August 1950, page 184), modified as described by A. C. Lapsley and J. P. Weiss (ibid, volume 56, January 1951, page 23).

Extent of fading of the dye images as a function of heat was tested by mounting portions of the processed strips described above for projection in a 35-millimeter, 1000-watt SVE Model #1000, Serial #3237 projector.[1] The portions of the processed strips so mounted were selected to include image areas ("steps" of the wedge exposure) having optical densities of about 2.0 at 644 millimicrons wavelength. The strip portions were exposed for a period of 20 minutes to the heat of the projector lamp with baffles arranged to prevent the blowing of air across the strip portions by the cooling fan. At the end of the 20 minute projection period, the densities of the strip portions were again read at 644 millimicrons as described above and compared with the previous density readings of the same image areas. It was found that the image formed from the naphtholic color former (Film A) suffered a density loss of only 6.8% from this exposure to heat while the phenolic color-former image (Film B) suffered a 17.4% loss in density under identical testing conditions.

EXAMPLE VI

The test of Example V was repeated except that, in the processing of the film strips, the color developer solution was changed to the following:

N - ethyl - N-($\beta$-hydroxyethyl)-p-phenylenediamine hydrochloride _____ g__ 3.1
$Na_2SO_3$ (anhydrous) _____ g__ 2.0
$Na_2CO_3 \cdot H_2O$ _____ g__ 47.0
KBr _____ g__ 2.0
$H_2O$ to make 1 liter.
pH=10.9±0.1.

With the 20 minute heating fading test as described above it was found that the naphtholic color-former image (Film A) suffered only a 10.9% loss in density while the phenolic color former image (Film B) suffered a 32.7% loss in density at optical densities which had been around 2.0 before the exposure to heat.

EXAMPLE VII

Film strips of the two coatings described in Example V were processed as described in that example except that an acid-sulfite fixing solution (rather than an alkaline fixing solution) was employed. Most color formers, and particularly cyan color formers, form dye images which exhibit various degrees of instability toward treatment with acid and sulfites. The formulae for the alkaline fix of Example V and the acid fix of Example VII are compared below:

|  | Alkaline Fix (Ex. V) | Acid Fix (Ex. VII) |
|---|---|---|
| $H_2O$_____ml__ | 800 | 800 |
| $Na_2S_2O_3$ (anhyd.)_____g__ | 127 | 153 |
| $Na_2SO_3$_____g__ | 0 | 15 |
| $Na_2B_4O_7 \cdot 10H_2O$_____g__ | 0 | 18 |
| Glacial Acetic Acid_____g__ | 0 | 12 |
| $KAl(SO_4)_2 \cdot 12H_2O$_____ml__ | 0 | 20 |
| $H_2O$ to make_____liter__ | 1 | 1 |
| Approximate pH | 9.4 | 4.5 |

The strip in Example VII (acid fix) was about 4% lower in density at corresponding exposures than in Example V (alkaline fix) for the naphtholic color former (Film A). For the phenolic color former (Film B), the strip in Example VII (acid fix) was about 11% lower in density at corresponding exposures than in Example V (alkaline fix).

---

[1] Made by the Society for Visual Education, Inc., Chicago, Ill.

EXAMPLE VIII

A multilayer color reversal photographic film element was prepared having a "conventional" structure comprising the following.

(a) A cellulose triacetate photographic film base support;

(b) A gelatino-silver bromo-iodide emulsion layer sensitive to blue and red light containing 6.8 mole percent silver iodide and 93.2 mole percent silver bromide and containing, per mole of silver halide, 181 g. of the 7% solution of the naphtholic cyan color-former described in Example I.

(c) A gelatino-silver bromo-iodide emulsion layer sensitive to blue and green light containing 6.8 mole percent silver iodide and 93.2 mole percent silver bromide and containing a nonmigratory pyrazolone magenta color former;

(d) A gelatin-colloidal silver intermediate layer for absorbing blue light;

(e) A gelatino-silver bromo-iodide emulsion layer sensitive to blue light containing 1.7 mole percent silver iodide and 98.3 mole percent silver bromide and containing a nonmigratory benzoylacetanilide yellow color former.

The film described above was slit to a width of 35 millimeters, conventionally perforated, and exposed in a Leica M-3 35-millimeter camera. The film was processed as described in Example V with resulting color transparencies of excellent pictorial quality.

The cyan color former which is the object of this invention, by producing less "greenish" dye images than many color formers known in the prior art, approaches very closely to the ideal "minus red" which is desired in a subtractive three-color photographic system. An overall improvement in color rendition was the obvious result when the above-described film was compared with a similar film employing a cyan color-former which gave a more "greenish" dye image.

Polyvinyl acetals prepared from these new aldehydes are of value in other color photographic processes where it is desired to have a 1-naphthol dye intermediate structure, such as in the azo process of United States Patents 2,297,732; 2,342,620; 2,220,929; and 2,339,213.

The cyan color-formers of this invention form indoaniline dyes of excellent quality by the color-coupling development of silver halide. Another advantage of the invention is that the indoaniline dyes so formed by development have excellent fastness to light. Moreover, these indoaniline dyes are also very stable chemically and, relative to corresponding phenol-type dyes, they show little density loss when exposed to sulfite or to acids. This stability of these naphthol-type dyes, in combination with the very desirable hue previously discussed, accounts for the superiority of these cyan dyes. A still further advantage of the present compounds is that they have been found particularly well suited for the preparation of stain-free, brilliant color photographs by the procedure of United States Patent 2,397,864. This freedom from stain is, at least in part, attributable to the high state of purity in which the intermediates can be obtained, prior to the final polymer-forming acetalization reaction with polyvinyl alcohol. As still another advantage, the compounds can be prepared in good yield from available, economical, commercial intermediates, thus lending themselves to a commercially practical procedure.

As many widely different embodiments of this invention can be made without departing from the spirit and scope thereof, it is to be understood that the invention is not to be limited except as defined by the claims.

We claim:

1. An essentially colorless cyclic macromolecular 1-hydroxy-2-naphthamidoalkylaldehyde polyvinyl acetal wherein the amidoalkyl group contains 1-4 carbon atoms, said acetal having intralinear —CH$_2$CHOH— units present in an amount up to 90% of the

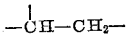

units of the acetal, the —CH$_2$CHOH— units and amidoalkylaldehyde units being present in 47 to 82 and 9 to 26.5 mole percent, respectively.

2. An essentially colorless polyvinyl acetal having intralinear —CH$_2$CHOH— units present in an amount up to 90% of the

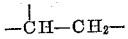

units of the polymer, said acetal being selected from the group consisting of a polyvinyl acetal composed of intralinear units of the formulae:

(1)

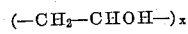

and a polyvinyl acetal composed of intralinear units of the formulae:

(2)

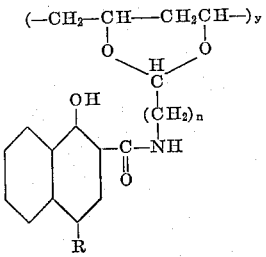

wherein R is a member selected from the group consisting of H, SO$_3$H and Cl; Q is a member selected from the group consisting of HO$_3$S-phenyl and its alkali metal and ammonium salts; n is a positive integer from 1 to 4, inclusive; and x, y, and z represent the number of units in the polymer; the free bonds of the units being linked in chain form.

3. An acetal according to claim 2 wherein units x are present in 47 to 82 mole percent, and units y and z are present in 9 to 26.5 mole percent, respectively.

References Cited by the Examiner

UNITED STATES PATENTS

| | | | |
|---|---|---|---|
| 2,472,910 | 6/49 | Martin | 260—73 |
| 2,513,189 | 6/50 | Martin | 260—73 |
| 2,739,059 | 3/56 | Priest | 260—73 |
| 2,929,710 | 3/60 | Martin | 260—73 |

WILLIAM H. SHORT, *Primary Examiner.*

LOUISE P. QUAST, *Examiner.*